May 13, 1958     L. NIXON     2,834,302
SELF-PROPELLING AERIAL TRAMWAY CAR

Filed April 30, 1954     14 Sheets-Sheet 3

May 13, 1958 L. NIXON 2,834,302
SELF-PROPELLING AERIAL TRAMWAY CAR
Filed April 30, 1954 14 Sheets-Sheet 5

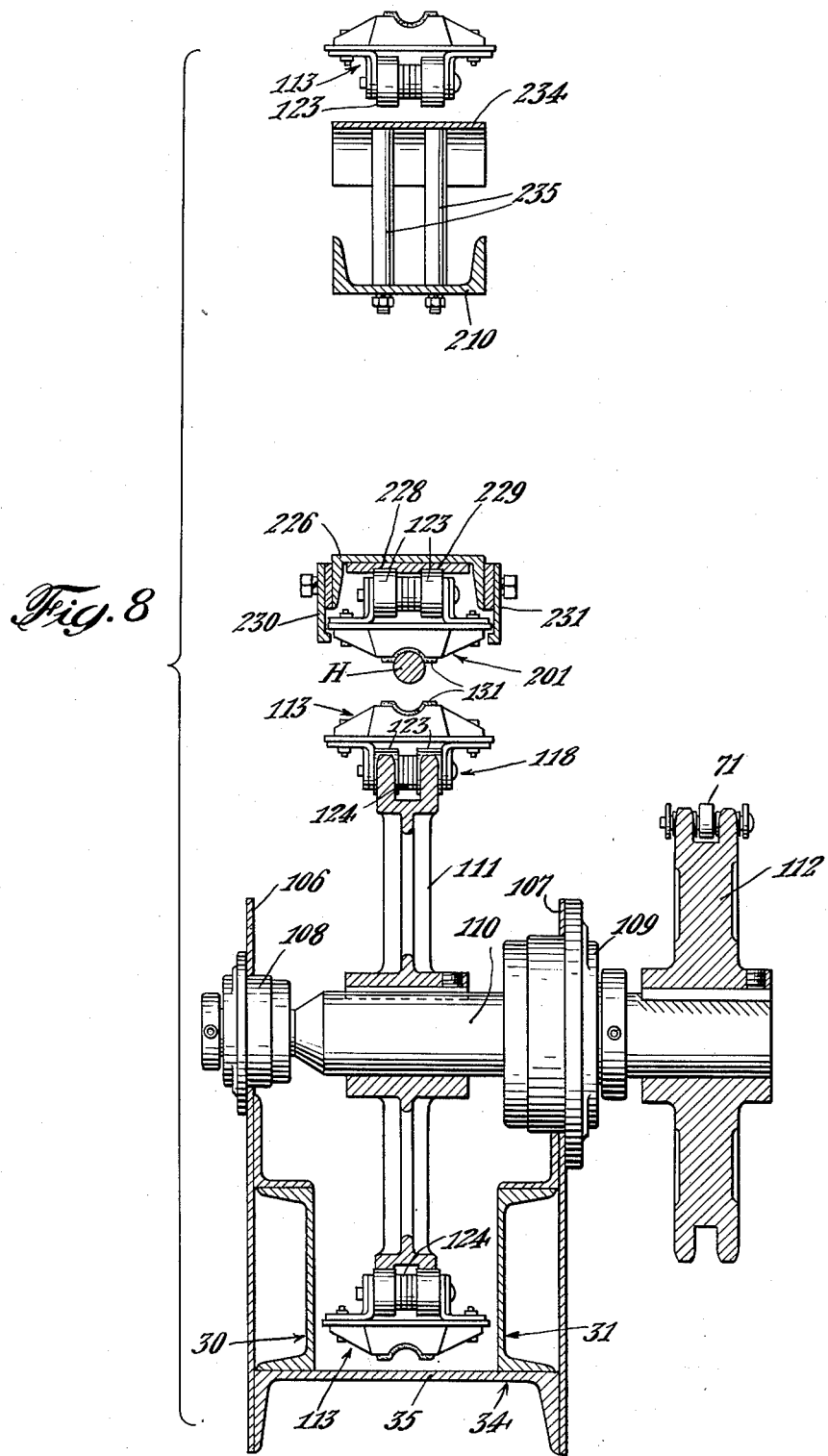

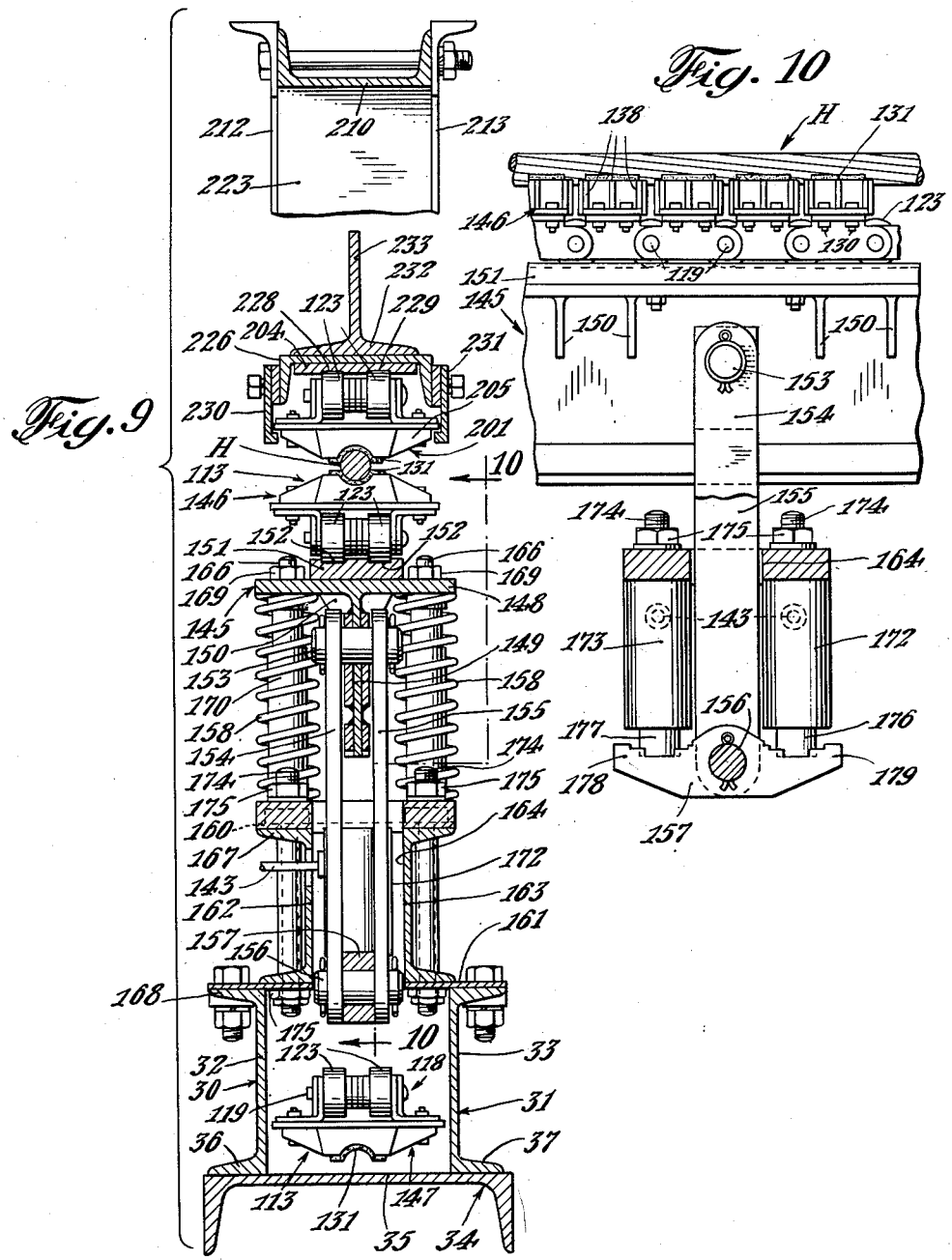

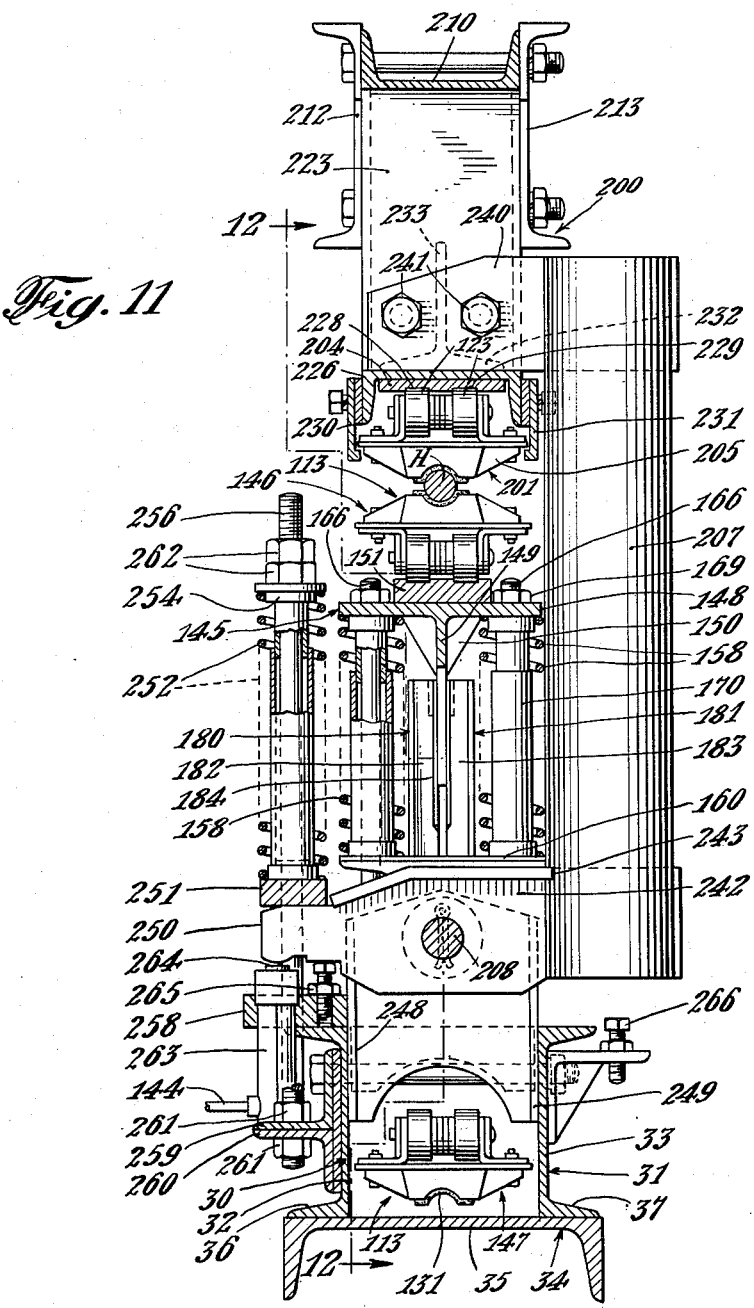

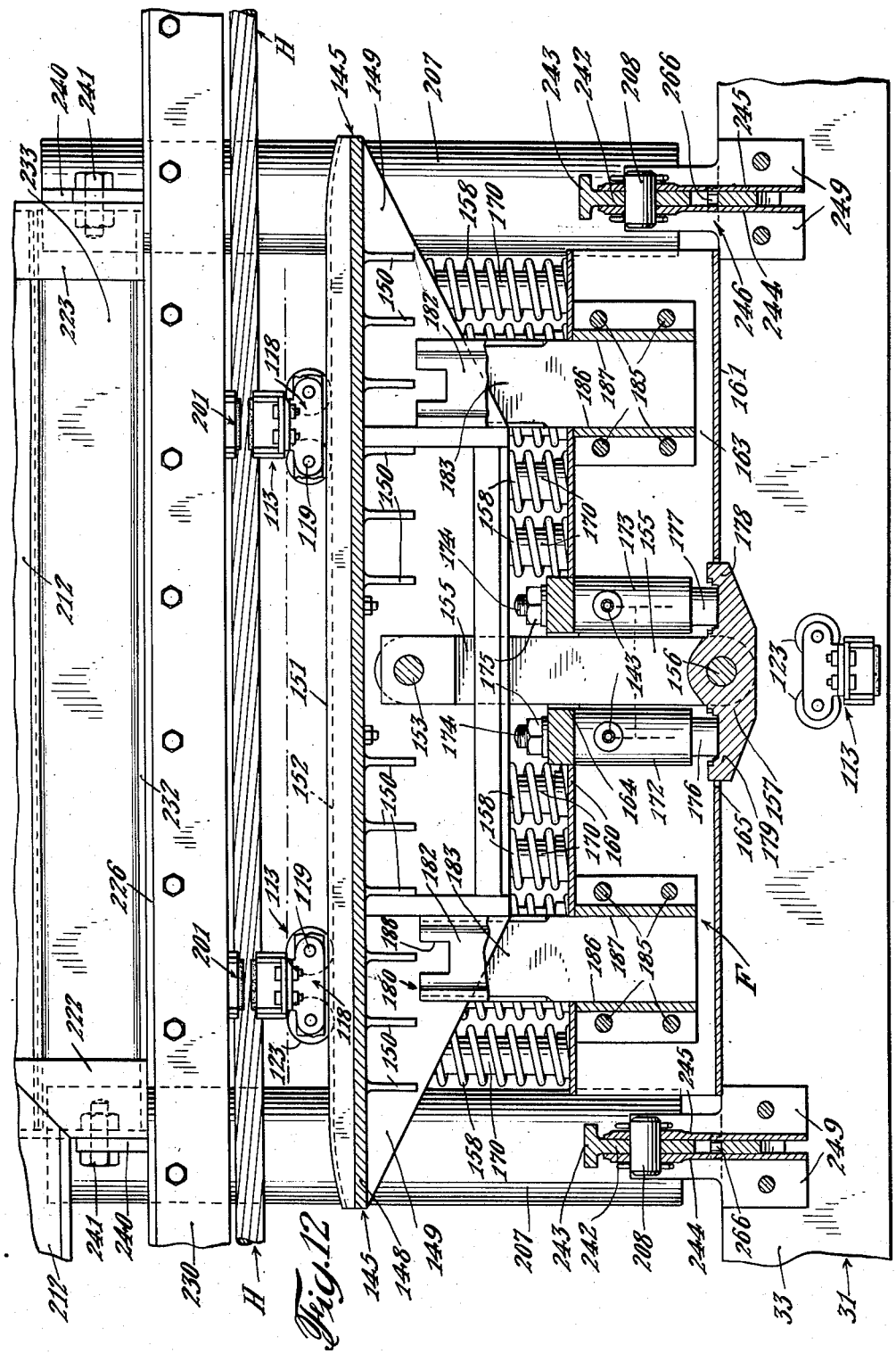

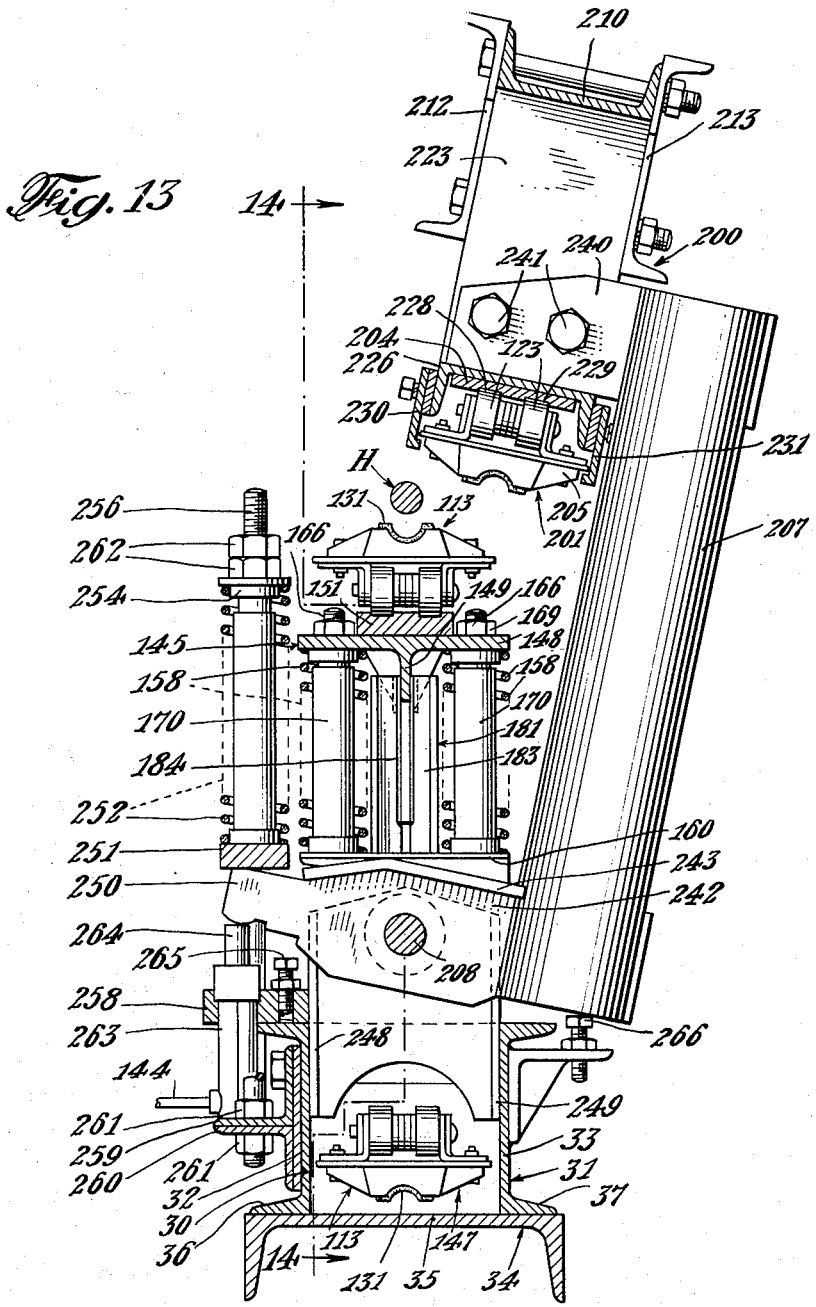

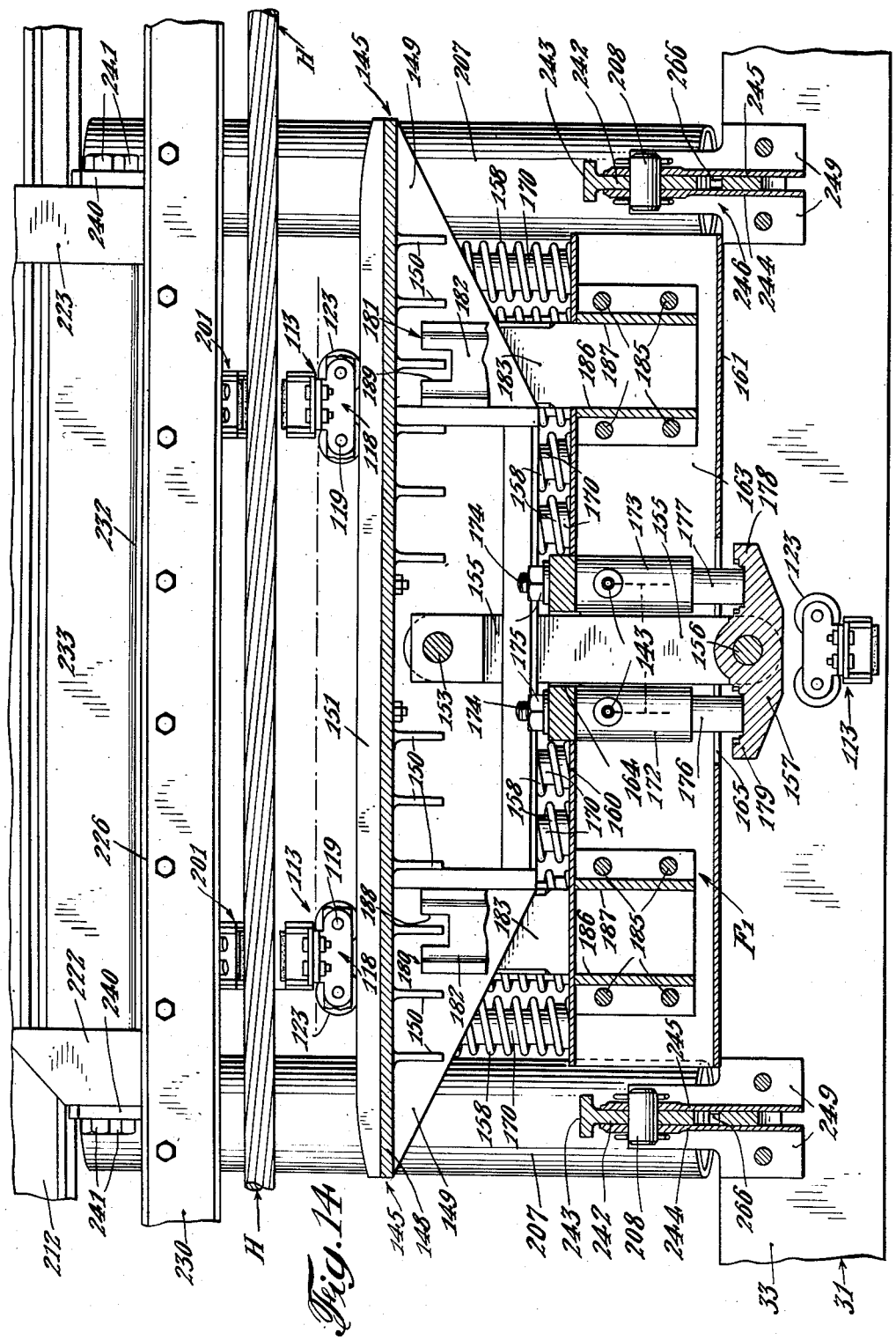

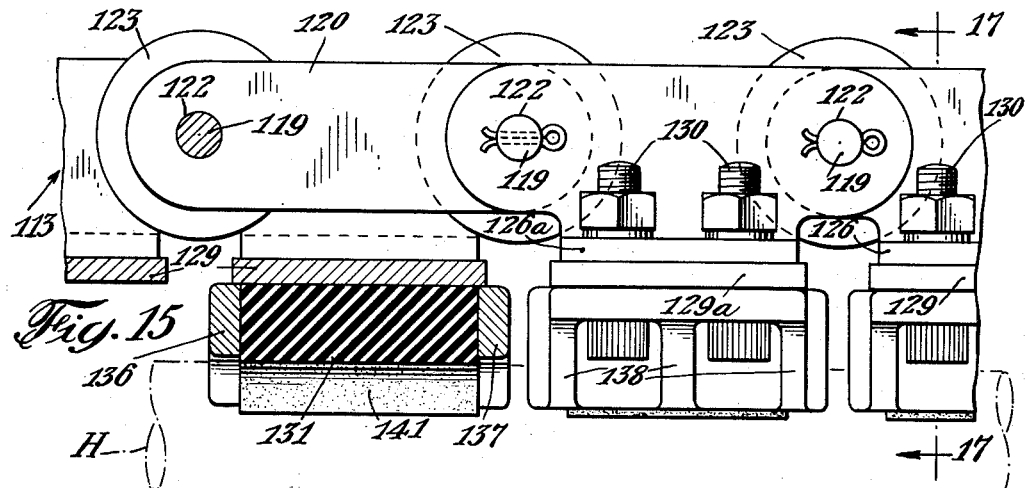
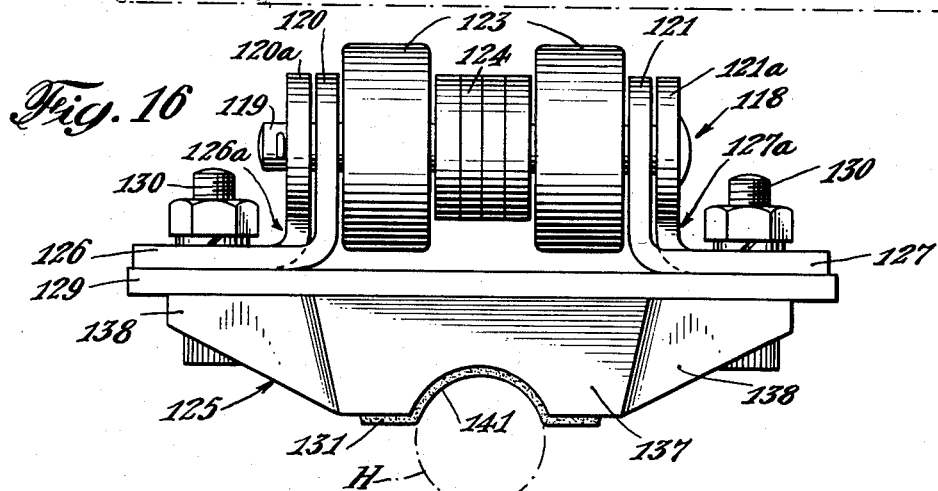
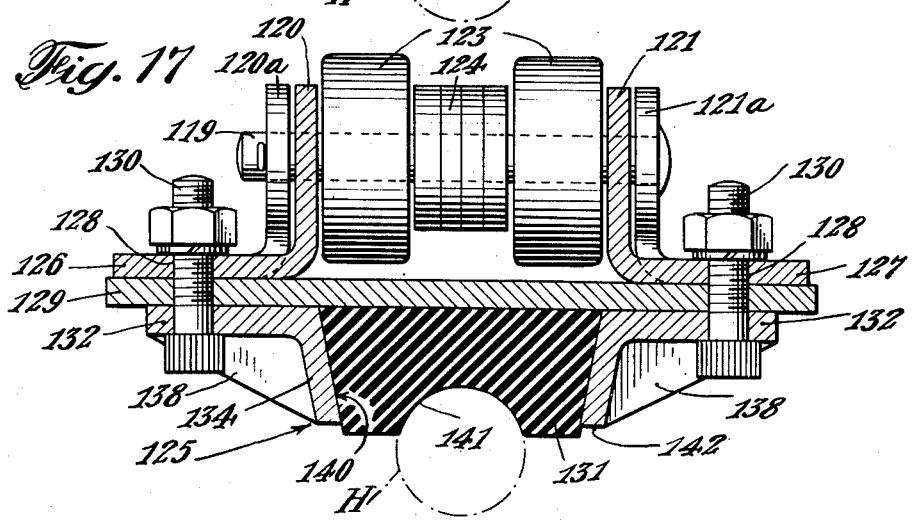

United States Patent Office 2,834,302
Patented May 13, 1958

2,834,302

SELF-PROPELLING AERIAL TRAMWAY CAR

Leroy Nixon, Newtown, Pa., assignor to John A. Roebling's Sons Corporation, Trenton, N. J., a corporation of Delaware Application April 30, 1954, Serial No. 426,741

10 Claims. (Cl. 105—148)

This invention relates to aerial tramways and more particularly to systems which utilize ropes as trackways upon which a suspended tramway car travels. Still more particularly the invention relates to self-propelled aerial tramway cars in which a prime mover is carried on the car itself to drive the car along the rope trackway.

In some aerial tramway systems the rope, suspended or otherwise mounted on suitable spaced towers or other mounting devices, is caused to move by a system of rotated sheaves and the cars or carriers are in one way or another secured to the moving rope, usually steel wire rope, and thus transported with the rope along the path of travel of the rope. In others, the wire ropes are stationary; that is, they do not move in the direction of the path of the rope but the ropes serve as trackways on which wheels of trolleys roll, the car being suspended from the trolleys; and, the stationary rope track serves to carry the weight of the suspended car and such additional lading or load, such as freight and the like, as may be placed upon the car for transportation. In the stationary rope track systems wherein the aerial tramway car is equipped with wheels or other rolling members which roll on the stationary rope track, the car may be moved along the rope track by a tow rope secured to the car, which tow rope may be caused to be moved or pulled by some suitable arrangement such as a windlass or by a system of rotated sheaves which normally are installed at way stations along the path of the stationary rope track so that, in effect, the cars are pulled or towed from one place to another along the rope track. Or, in a stationary rope track system the tramway car itself may carry a suitable driving mechanism to cause the wheels of the trolley to roll on the rope track. This latter type of car is herein referred to as a "self-propelled" aerial tramway car. That is, a prime mover is mounted on the car to drive it along the trackway and it is to this type of aerial tramway system that this invention relates.

In accordance with the invention a self-propelled aerial tramway car is provided which has trolleys which ride on and move along a stationary rope track, the car being suspended from the trolleys. The car is equipped with a propelling mechanism which comprises a gripper mechanism operative to be engaged to and disengaged from a stationary traction rope positioned in the path of travel of the car. The propelling mechanism comprises complementary continuous link belts; the links of which carry traveling shoes or treads which are caused to grip the traction rope with sufficient friction to cause the car to move along the rope track as the shoes travel along the stationary traction rope. The traveling shoes engage the traction rope over a considerable length to provide ample driving power to transport the car and its lading. The propelling mechanism is so contrived that it may be readily engaged with the traction rope in operative position (viz: "cast on" to the traction rope) to propel the car or disengaged from or "cast off" from the traction rope. This feature is of significant importance because this arrangement provides a convenient way of transferring a car from the tail end of one length of rope track to the head end of the next length of rope track in a system which covers a great distance requiring a plurality of suspension towers. This "casting off" feature has other advantages mentioned in further detail hereinafter.

According to one embodiment of the invention, the aerial tramway car is provided with a trolley or truck at each end of the car and a trolley or truck intermediate the two end trolleys, each trolley or truck being provided with two pairs of oppositely disposed wheels having grooved peripheral flanges which are adapted to ride and roll on a pair of suspended parallel ropes providing a rope track or ropeway on which the trolley wheels roll. Of course, a different number of trolleys may be utilized, if desired. The main frame of the tramway car is suspended on the trolleys by suitable members secured to the trolley frames and the main frame. Suspended from the main frame is an operator's cage which also provides means upon which to mount a prime mover for driving the car and also to mount other equipment, such as mechanism for lifting and lowering a lading carrier, which may also be suspended from the main frame. The mechanism for engaging the traction rope and propelling the car is mounted on the main frame and is connected to the prime mover through suitable driving connections which may be link chains, gearing, or other suitable driving means. The propelling mechanism comprises, in general, an upper frame mounting a sprocket wheel for rotation at each end; an endless or continuous link belt carrying a continuous line of gripper shoes or treads being trained over the two upper frame sprockets and the propelling mechanism includes two lower frames, each of which is provided with a pair of sprocket wheels, one of each pair being driven by the prime mover mounted on the car, an endless link belt carrying a continuous line of gripper shoes or treads being trained over the sprocket wheels. The lower run of the upper continuous link belt and the upper runs of the two lower continuous link belts lie adjacent each other in such manner as to grip a stationary traction rope when it is desired to propel the car and the arrangement is such that the traction rope grippers may be caused to grip the traction rope to propel the car or to be disengaged and cast off from the traction rope to release the car from the traction rope.

Although the novel features which are believed to be characteristic of the invention will be pointed out in the annexed claims, the invention itself as to its objects and advantages and the manner in which it may be carried out may be better understood from the following description taken in connection with the accompanying drawings forming a part hereof, in which:

Figure 1:
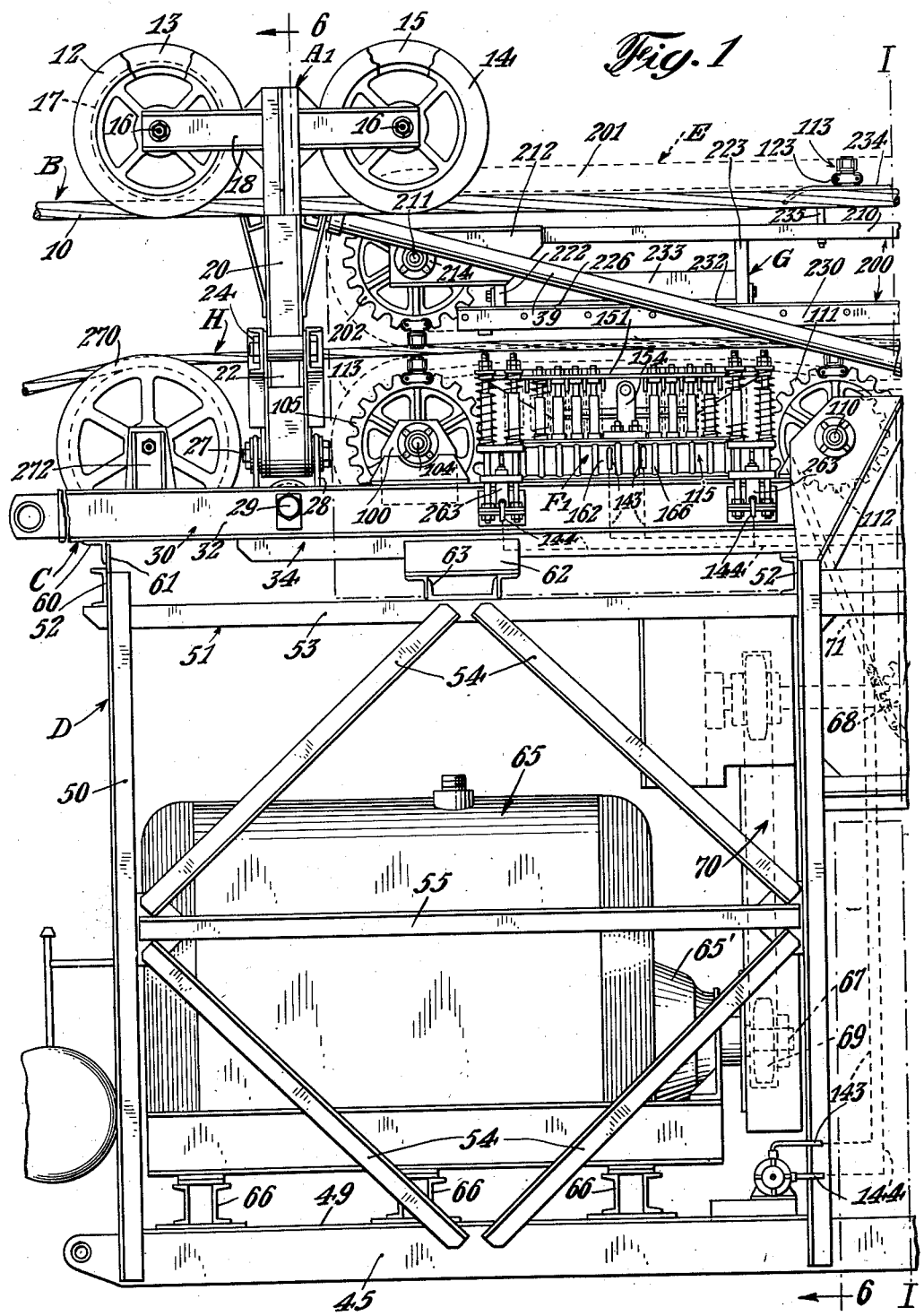
Fig. 1 is a side view in elevation partly broken away of the forward end of an aerial tramway car embodying the invention.
Figure 2:
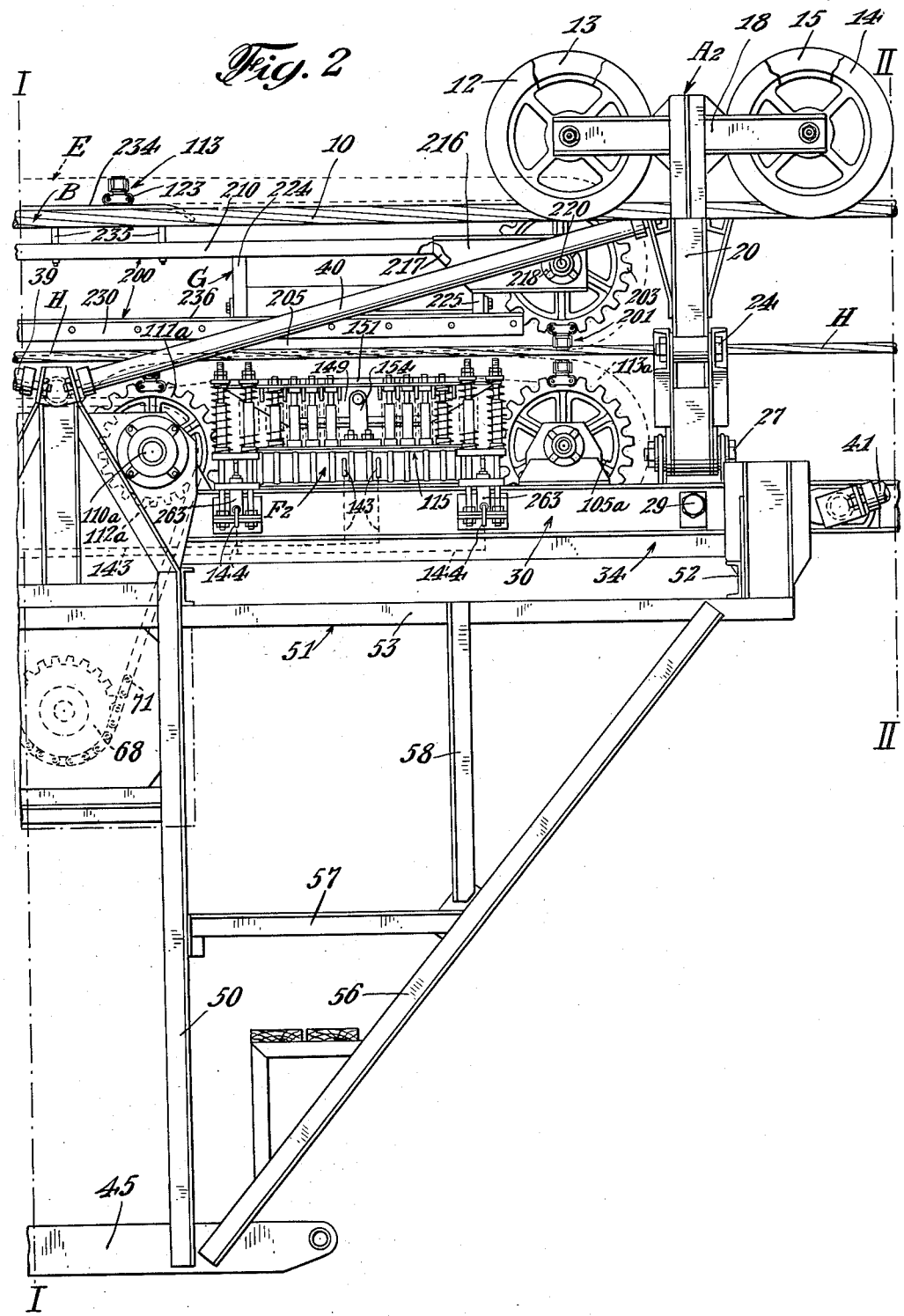
Fig. 2 is a side view in elevation partly broken away of the part of the car intermediate the forward and rear ends.
Figure 3:
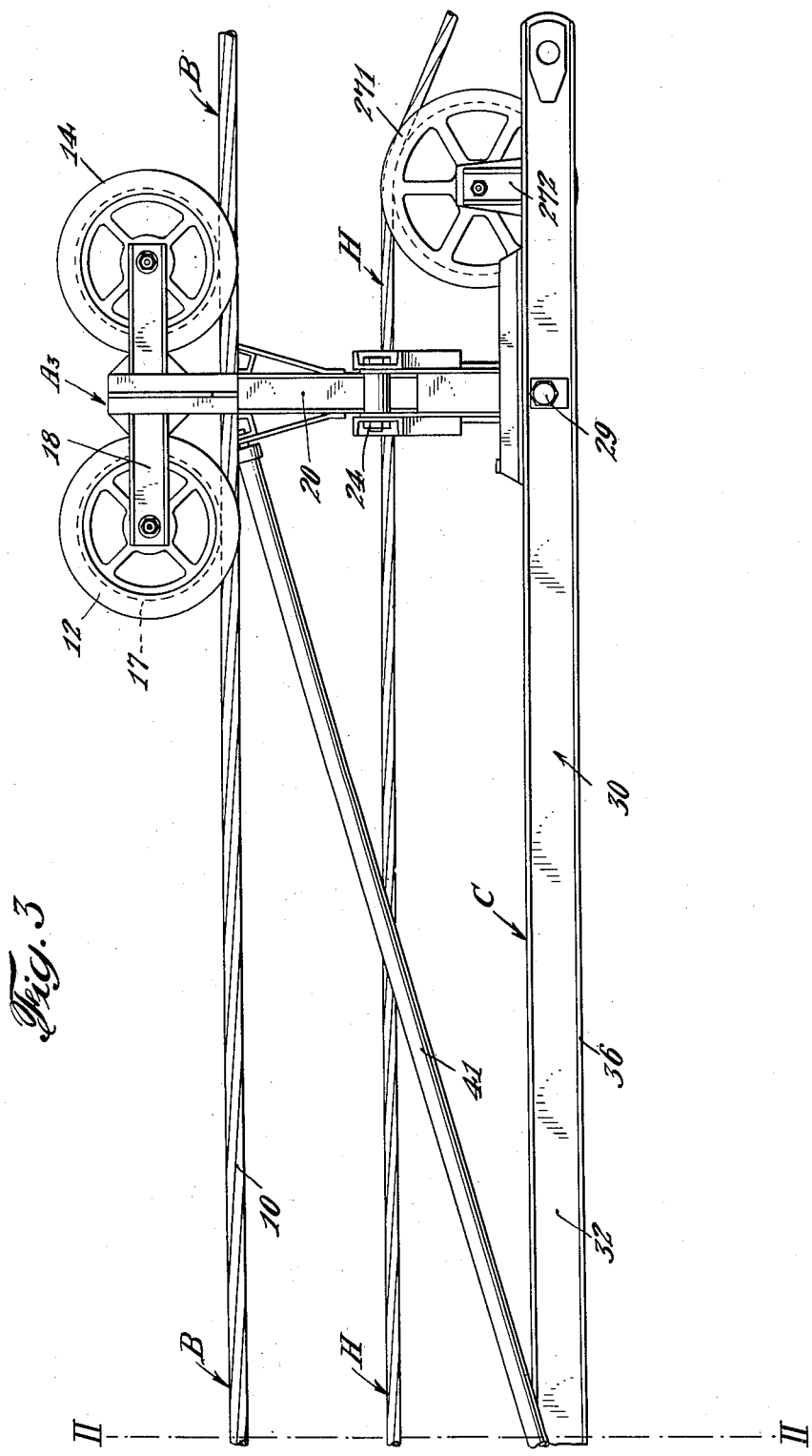
Fig. 3 is a side view in elevation of the rear end of the car.

It will be noted that Figs. 1, 2 and 3 together when joined on lines I—I and II—II constitute a side view in elevation of the car with certain parts broken away to reveal the mechanism.

Figure 4:
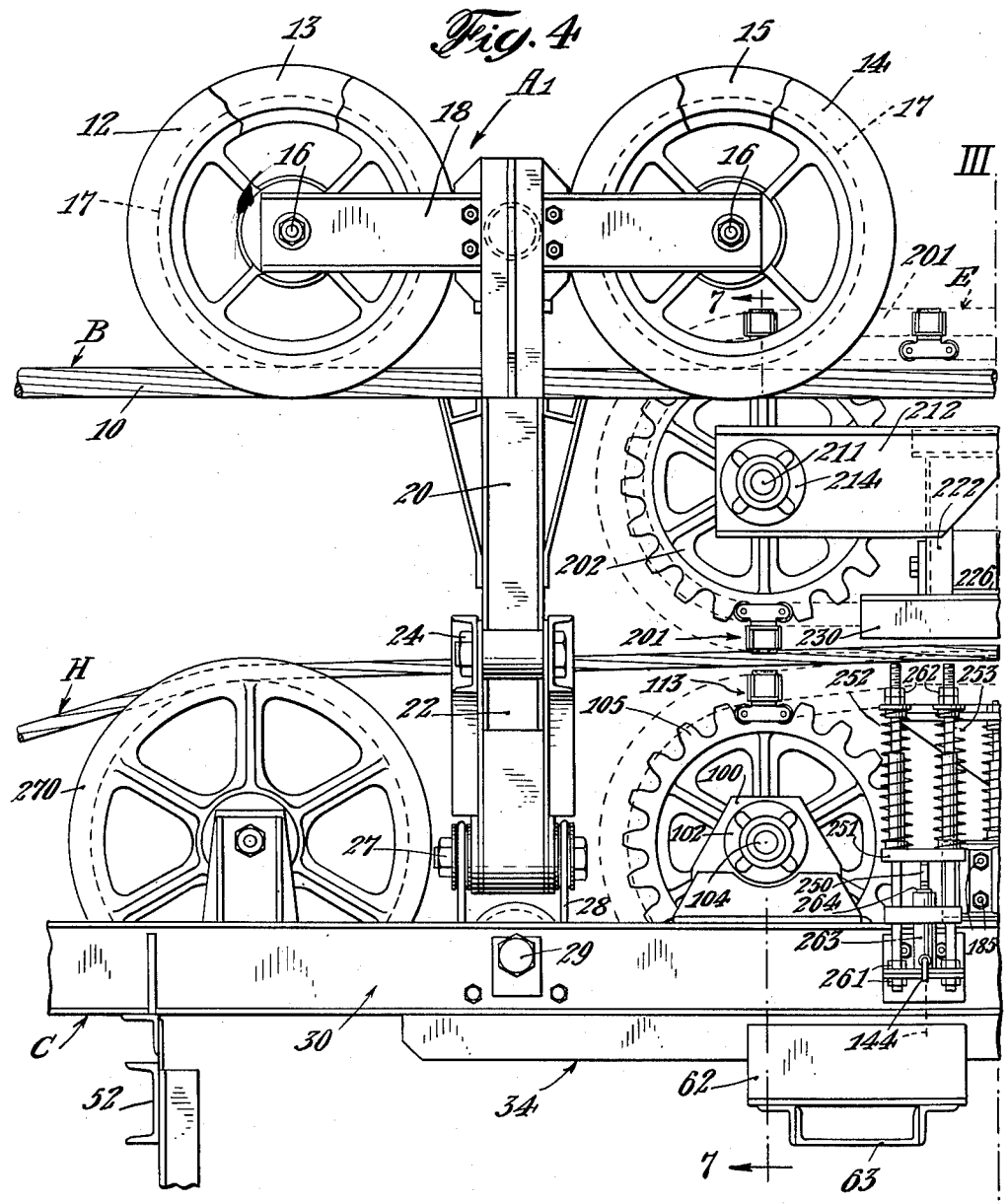
Figure 5:
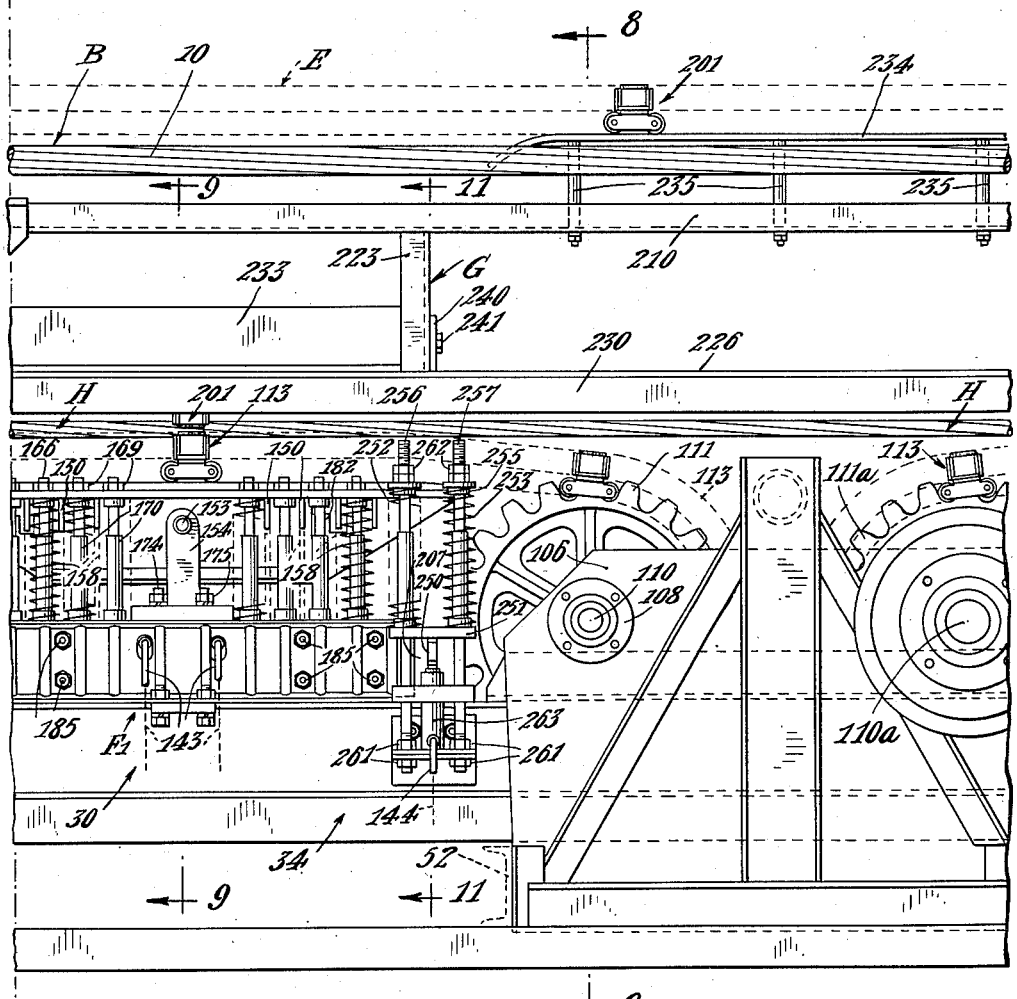
Figure 6:
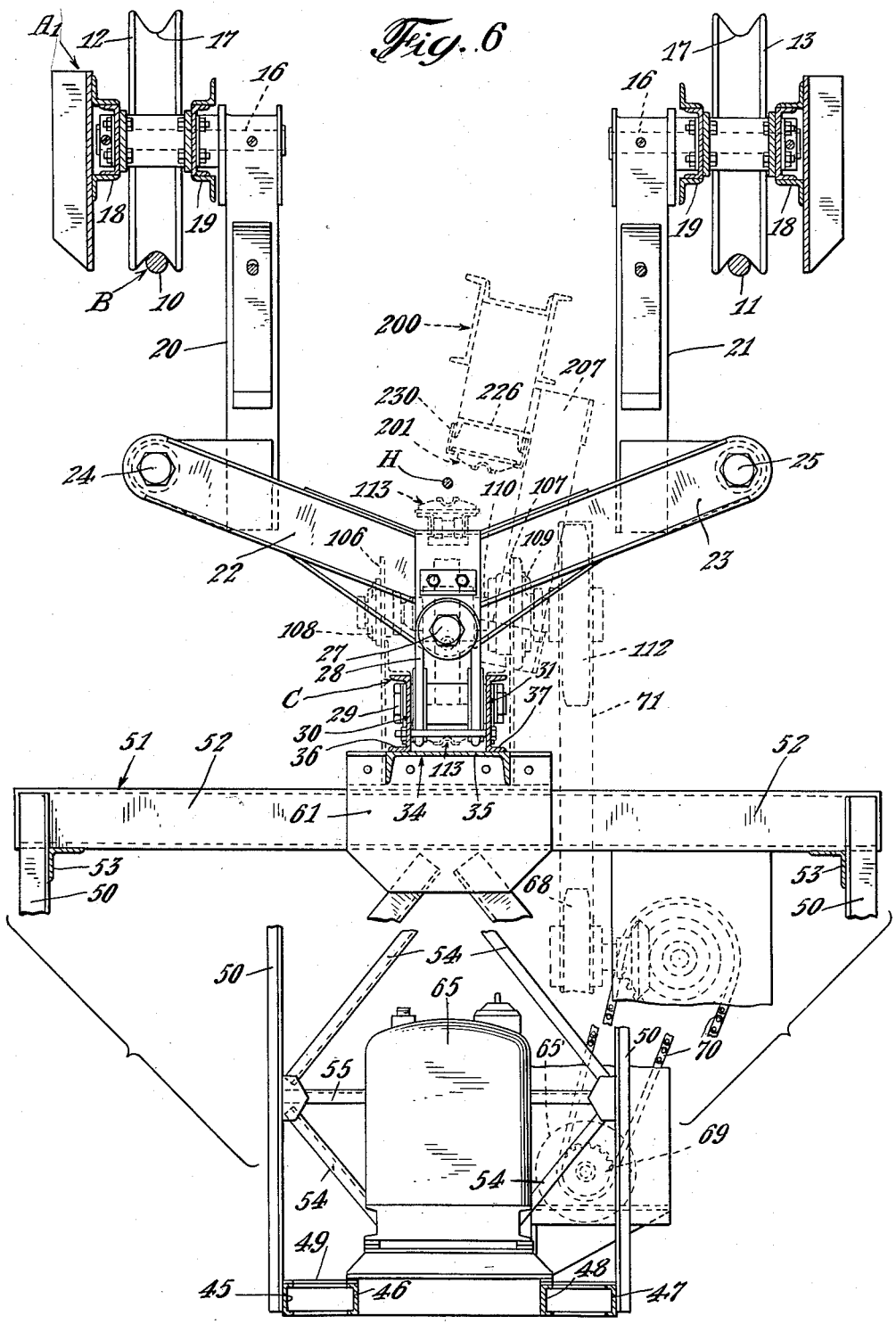
Figure 7:
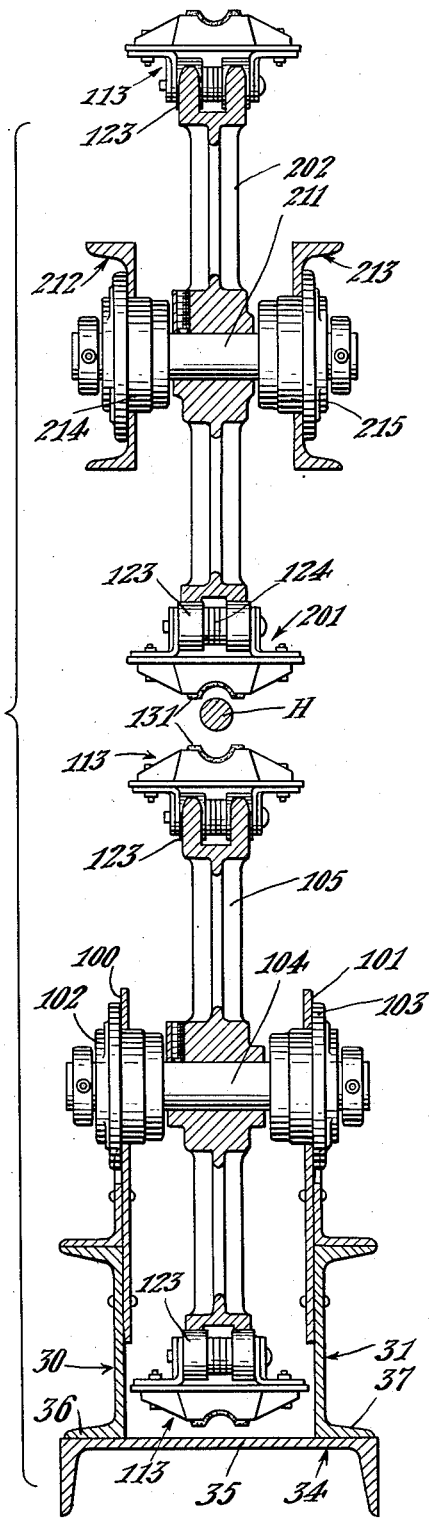

Figs. 4 and 5 are side views in elevation and when joined on lines III—III represent a side view in elevation partly broken away and to larger scale of the forward end of the car shown in Fig. 1;

Fig. 6 is a view on line 6—6 of Fig. 4 showing a trolley and the manner of securing the main frame thereto; it being noted that the lower part of the drawing is to smaller scale because of limitations imposed by the size of the sheet;

Fig. 7 is a view on line 7—7 of Fig. 4 showing the gripper belt sprockets at the forward end of the propelling mechanism;

Fig. 8 is a view on line 8—8 of Fig. 5 showing a gripper belt sprocket having a drive pulley on its shaft;

Fig. 9 is a view on line 9—9 of Fig. 5 showing particularly the gripper belts in operative position engaging the traction rope;

Fig. 10 is a view on line 10—10 of Fig. 9;

Fig. 11 is a view on line 11—11 of Fig. 5 showing the parts in operative position and particularly the manner of mounting the upper gripper belt and frame assembly;

Fig. 12 is a side view in elevation and partly in section on line 12—12 of Fig. 11 showing particularly the guide and support for the upper run of a lower gripper belt;

Fig. 13 is a view similar to Fig. 11 but showing the parts in inoperative or cast off position;

Fig. 14 is a view similar to Fig. 12 but showing the parts in inoperative or cast off position and on line 14—14 of Fig. 13;

Fig. 15 is a side view in elevation and partly in section of a length of gripper belt showing typical gripper links; and Fig. 16 is an end view of a typical gripper link; and Fig. 17 is a view in section of a gripper link on line 17—17 of Fig. 15.

Referring now to the drawings (Figs. 1, 2, 3) wherein there is illustrated an aerial tramway car embodying the invention, the car, in general, comprises a plurality of trolleys A (designated separately by reference numerals A, 1, 2, 3) having wheels all adapted to roll on a rope track B, a main frame C suspended from the trolleys and on which is suspended an operator's cage D upon which may be mounted a prime mover to operate the propelling mechanism E. The propelling mechanism E comprises, in general, two lower gripper frame assemblies $F_1$ and $F_2$ and an upper gripper frame assembly G. The two lower assemblies $F_1$ and $F_2$ are mounted on main frame C and each includes an endless traveling gripper link tread belt, the upper run of which is supported on guides normally urged upwardly to cause the treads of the upper run to engage a stationary traction rope H. The upper assembly G includes an endless traveling gripper link tread belt, the lower run of which travels along a guide above the upper runs of the traveling endless belt on the lower assemblies $F_1$ and $F_2$ and the treads engage the stationary traction rope H. The rope H is gripped between the lower run of the upper belt and the upper runs of the lower belts with sufficient friction to cause the car to be transported along the rope track B when the belts are caused to travel. The upper frame assembly G, including its frame members, guides, sprocket wheels, and link gripper belt, is carried on the lower frame assemblies $F_1$ and $F_2$ which in turn are carried on main frame C. The assemblies $F_1$, $F_2$ and G of the propelling mechanism are so arranged and mounted that they may be manipulated to move the gripper belts to a position in which they are disengaged from the traction rope H and thereby to release the traction rope from the grip of the upper and lower belts and thus to permit the propelling mechanism E to be "cast off" from the traction rope; or, the propelling mechanism E may be manipulated to bring the gripper belts into operative position in which they engage the traction rope with sufficient friction to drive the car in either direction along the rope track B. A suitable lading carrier (not shown) may be suspended from the rear portion of the main frame C and, if desired, it may be in the form of an elevator carrier which may be lifted and lowered by suitable mechanism which may be mounted on and operated from a prime mover carried on the operator's cage D.

In the illustrative embodiment shown in the drawings, in which like reference characters denote similar parts, a typical trolley A is perhaps best illustrated in Fig. 6 taken with Fig. 1 where it is shown on the rope track B which comprises two parallel stationary steel wire ropes 10 and 11. It will be understood that the wire ropes 10 and 11 are suspended overhead by mounting them at both ends on suitable towers or other mounting means placed a considerable distance apart.

As shown, each trolley has two pairs of oppositely disposed wheels 12, 13, and 14, 15, each wheel being mounted on a stub shaft 16 (see Figs. 1 and 6). The stub shafts are mounted on horizontal frame members 18, 19 secured to vertical frame members 20, 21. The wheels, having an annular grooved tread surface 17, are mounted for rotation and roll on the stationary ropes 10 and 11 which form the trackway. The lower ends of vertical frame members 20, 21 are secured to the outer ends of two outwardly extending arm members 22, 23 by bolts 24, 25. The inner ends of the arms are secured to a centrally located vertically disposed frame member 26 by a bolt 27, which passes through a clevis 28 secured to main frame C by bolt 29.

The main frame C of the car comprises, in general, a pair of horizontal oppositely disposed channel members 30, 31 extending the full length of the car and having their webs 32, 33, positioned and maintained in vertical planes in spaced parallel relation by structural members placed at various places along the length of the two main channel members 30, 31, these structural members being referred to in further detail hereinafter. One such structural member is an inverted channel 34 which extends from a point slightly forward of the clevis 28 of the forward trolley A, 1 and slightly aft of the clevis 28 of the intermediate trolley A, 2 to provide ample strength where the propelling mechanism E is located. Referring to Fig. 6, it will be noted that the lower flanges 36, 37 of the main channels 30, 31 rest on and are secured to the web 35 of the channel 34. The rear end portion of the main frame C aft of the operator's cage D provides means upon which to suspend a lading carrier (not shown) which may be, if desired, of a type suspended on suitable ropes and lifted and lowered by suitable mechanism. Such mechanism may, if desired, be mounted on the cage D. Thus, the main frame C provides means upon which to mount the propelling mechanism E, which includes upper assembly G and lower driven assemblies $F_1$ and $F_2$, and traction rope guide sheaves 270, 271, fore and aft, respectively. It will be observed also that bracing members 39, 40, 41, secured to the frames of trolleys A, 1, 2, 3, and anchored to structural members secured to the main frame C, are provided on each side of the main frame to provide additional strength and desired rigidity.

The cage D comprises structural steel members secured together to form a means for mounting a prime mover and such other equipment as may be desired for operating the car and its various mechanical devices. As shown, it comprises a plurality of channels 45, 46, 47, 48 secured together to form a rigid suspended platform base or floor 49. Vertical angle members 50 on each side of the base and at its corners are secured to the base at their lower ends. The upper ends of these vertical angle members are secured to a rectangular frame 51 comprising suitable brace channel members 52 and angle members 53. The cage is suitably braced by cross brace members 54, 55, 56, 57, 58 to give strength and desired rigidity.

The cage D is suspended from main frame C in any suitable manner. As shown, cross angle member 60 secured to the main frame supports a plate 61 which in turn is secured to cross channel 52, there being a similar cross angle 60 and plate 61 on each of the cross channels 52 of the upper frame 51 of the cage D. The cage is further secured to the main frame C by vertical plates 62 secured to the webs of channel 34 which plates are in turn secured to a cross channel member 63 which is secured to angle members 53 of the upper rectangular frame 51 of the cage.

A prime mover and such other equipment as may be necessary to drive the car and operate the various mechanical devices on the car may be mounted and carried on the cage D. In the embodiment illustrated in the drawings, an internal combustion engine 65 is mounted on channels 66 extending crosswise of the frame members 45, 46, 47, 48. The drive shaft 67 of the motor 65 is connected with a driving sprocket wheel 68 mounted on the cage for rotation. The driving connections are indicated conventionally in dash lines. The sprocket wheel 69 is driven by motor 65 and it drives sprocket wheel 68 through a transmission, clutch, and chain drive mechanism, designated generally by reference numeral 70. It will be understood that the drive mechanism from the motor 65 may take various forms to rotate the drive sprocket wheel 68, which, as shown, is mounted on the cage for rotation. Trained over the driving sprocket wheel 68 is a link chain belt 71 which is trained over drive sprockets on the gripper assemblies as described in further detail hereinafter.

The propelling mechanism, which is mounted and carried on the main frame C, comprises, in general, an upper gripper belt assembly G, having an endless gripper link tread belt which is not driven and two lower gripper belt assemblies $F_1$ and $F_2$, each of which is driven by motor 65 mounted on cage D, as described hereinafter. That is, the upper gripper belt is trained over idler, freely rotating sprocket wheels whereas each of the two lower gripper belts is trained over sprocket wheels at least one of which is power driven.

Inasmuch as the two lower assemblies $F_1$, $F_2$ are substantially alike, it will suffice to describe only one in detail. Mounted on the main channels 30, 31 are two upstanding plates 100, 101 (see Figs. 4, 7) which carry bearings 102, 103 in which are mounted for rotation a sprocket shaft 104 to which is keyed an idler sprocket wheel 105; and also two upstanding plates 106, 107 (see Figs. 5, 8) which carry bearings 108, 109, in which are mounted for rotation a sprocket shaft 110 to which is keyed a driven sprocket wheel 111. It will be noted that shaft 110 has keyed thereto at its outer end a drive sprocket wheel 112 over which is trained the sprocket drive chain 71 previously referred to. Trained over idler sprocket wheel 105 and driven sprocket wheel 111 is an endless link belt 113, each link of which includes a tread shoe housing in which is mounted a tread shoe of resilient material, which may be rubber, synthetic elastomer, or other suitable material having resilient and wear resisting characteristics. This type of belt is herein referred to as a gripper belt. The links themselves which make up the endless gripper belts, like gripper belt 113, are perhaps best shown in Figs. 15—17. A belt comprises a number of links, the alternate ones of which are alike. A typical link 118 comprises side link plates 120, 121 having bores 122 through which extend pins 119 on which rollers 123 are mounted for rotation; the rollers 123 being spaced apart by spacers 124. The side plates 120, 121 are turned outwardly at right angle to form plate supporting portions 126, 127 for attaching a shoe housing 125. The flat portions 126, 127 have bores 128 registering with bores in cross plate 129 to which the shoe housing 125 is secured by bolts 130. It will be noted that the links are alike except that the side link plates 120a, 121a of alternate links are slightly different in that the portions 126a, 127a are narrower than the corresponding portions 126, 127 of the next adjacent link so that when the side plates 120, 121 of the link are mounted on the pins 119, the side plates of the link on each side of it are behind the corresponding side plates 120a, 121a.

The shoe housing or retainer 125 is of particular shape to retain the resilient gripper shoe 131 which, as shown, is wear resisting synthetic elastomer. The shoe retainer casting 125 comprises a flat portion 132 from which extend outwardly directed side walls 134, 135 and end walls 136, 137 and reinforcing ribs 138. The inner surfaces of the side walls 134, 135 taper so that the correspondingly shaped outer surface of the resilient shoe 131 is securely maintained in place in the retainer cup 140, formed by the retainer casting 125. The shoe 131 has a centrally located longitudinal groove 141 to conform with the outer peripheral surface of the traction rope H and the shoe extends a little beyond the edges 142 of the retainer cup 140 (see Fig. 17). It will now be seen that the traction rope can be gripped between the resilient shoe of a link below the rope and the resilient shoe of the link above the rope when the links above and below the rope are urged toward each other into engagement with the rope.

Referring again more particularly to the lower gripper assembly $F_1$, there is provided a gripper belt guide and support member which preferably is in the form of a casting 145. This guide and support member 145 is positioned between sprockets 105, 111 and between the upper run 146 and the lower run 147 of the endless link belt 113. This casting 145, which is T-shaped in cross-section, comprises a table portion 148 of considerable length from which depends a centrally located plate or leg portion 149 and reinforcing fins 150 (see particularly Figs. 4, 9, 11, 12). The table 148 provides means on which is securely supported a trackway 151 on which the rollers 123 of the links of the upper run 146 of belt 113 may roll. It will be noted that the trackway 151 is provided with guide channels 152 to receive and guide the rollers 123. The casting 145 is so arranged that it may be moved upwardly and downwardly within limits and it supports and guides the upper run 146 of the gripper belt 113. It is normally urged upwardly by springs, later to be described, and in normal position urges the tread shoes 131 of the links of the upper run 146 of the belt 113 toward the lower run of a similar link belt which is supported by and travels freely on sprockets mounted on the upper gripper frame assembly G, described in further detail hereinafter.

The supporting casting 145 (see Figs. 9, 10, 11, 12) has a horizontal bore located below the table portion 148 and midway of its length, through which a pin 153 extends. Pivotally mounted on the pin 153 on each side of the plate or leg 149 is a link 154, 155, the other ends of each of these links being pivotally mounted on pin 156 which extends through a bore midway of a cross head 157. However, the casting 145 is supported on compression springs 158 which are in turn supported on suitable members which are mounted on and carried by the channels 30, 31 of the main frame C (see Figs. 4, 5, 9). A row of compression springs 158 is provided under the table portion 148 along each side of the leg 149. The lower ends of springs 158 rest upon a base plate 160 which in turn rests upon a pair of channel members 162, 163, maintained in parallel spaced relation; it being noted that the lower flanges of these channels rest upon a plate 161 which rests upon the upper flanges of main frame channels 30, 31. The plate 160 has a cut out portion 164 and the plate 161 has a cut out portion 165 through which the links 154, 155 may be moved upwardly and downwardly.

The manner of mounting the compression springs 158 is shown perhaps best in Fig. 9 wherein a typical mounting will be seen for each spring 158. A long bolt 166 extends through a bore in the table 148 of the casting 145 and through the plate 171 and the flanges 167, 168 of the channel 162. Bolt 166 is maintained in position by suitable nuts 169 on each end of the bolt; a spring retaining sleeve 170 being inserted on the bolt between the plate 171 which rests upon the flanges 162, 163, and the table portion 148 of casting 145. Each of the springs 158, in the rows of springs extending along the flat legs 149 of the casting 145, is similarly mounted. Although the springs 158 normally urge the casting 145 and its table 148 and its trackway 151 upwardly, it may, however, be moved downwardly from its normal position against the force of the compression springs 158.

The plate 160 which rests upon the upper flanges of channels 162, 163 serves to mount a pair of hydraulic cylinders 172, 173. These cylinders are located between the webs of channels 162, 163 and are secured to the plate 160. Suitable bolts 174 and nuts 175 secure the plate 160 to the flanges of the channels 162, 163.

The outer ends of the piston rods 176, 177 of the hydraulic cylinders engage detents in the arms 178, 179 of the cross head 157. These hydraulic cylinders 172, 173 operate in conventional fashion and serve as jacks to jack down the casting 145. That is, when hydraulic fluid under pressure is introduced into the cylinders 172, 173 and cause the pistons to advance from the cylinders, the piston rods 176, 177 force the cross head 157 in a downward direction against the force of the springs 158, move the links 154, 155 downwardly, and the entire casting 145 together with its trackway 151 is moved downwardly to the position shown in Figs. 13, 14. When the hydraulic cylinders are operated to retract the piston rods 176, 177, the springs 158 return the casting 145 upwardly toward the traction rope H to the position shown in Figs. 9, 11, 12. The hydraulic fluid lines which connect with the hydraulic cylinders and a pressure pump on the cage is indicated conventionally by dash lines 143 and the hydraulic cylinder 172, 173 of assembly $F_1$ operate in unison with the corresponding cylinders 172a, 173a of assembly $F_2$.

Provision is made to prevent any wobbling motion of the casting 145 and to maintain its trackway 151 in proper alignment. Vertically disposed guides 180, 181 (see Figs. 11, 12) are fixedly mounted on channels 162, 163. The guide 181 at the forward end of casting 145 comprises a pair of upstanding channels 182, 183 having their respective webs back to back but spaced apart sufficient distance to provide a slot 184 between them to permit the flat leg 149 of the casting 145 to move upwardly and downwardly in slidable engagement with the side walls of the slot. The bottom ends of the upstanding channels 182, 183 are secured to cross channels 186, 187 and the webs of these are secured to the webs of channels 162, 163 by bolts 185, the channels 162, 163 in turn being mounted on plate 162 which rests upon main frame channels 30, 31. The guide 180 at the forward end of casting 145 is similarly constructed and mounted. It may be noted that the upper ends of guides 180, 181 have cut away portions 188, 189 so that the reinforcing fins 150 do not interfere with the vertical movement of casting 145.

The lower gripper belt assembly $F_2$ is similar in construction to the assembly $F_1$ described above, except that whereas the shaft 110 on which the rear sprocket wheel 111 of assembly $F_1$ is mounted, has keyed thereto a driven sprocket wheel 112, the forward sprocket wheel shaft 110a (see Fig. 2) on which wheel 111a of assembly $F_2$ is mounted has a corresponding driven sprocket wheel 112a keyed thereto. That is, forward sprocket wheel 105 of assembly $F_1$ is an idler and the aft sprocket wheel 111 is driven, whereas forward sprocket wheel 111a of assembly $F_2$ is driven whereas aft sprocket wheel 105a is an idler.

The drive chain 71 is trained over drive sprocket 112 of assembly $F_1$, drive sprocket 112a of assembly $F_2$, and the drive sprocket 68 which is mounted on cage D. Thus it will be seen that when drive sprocket 68 is driven, through driving connections 70, by motor 65', the gripper belt 113 of assembly $F_1$ and the gripper belt 113a of assembly $F_2$ will be driven simultaneously in the same direction (see Figs. 1, 2).

The upper gripper belt and frame assembly G (see Figs. 1, 2) comprises a frame 200 on which is mounted idler sprocket wheels 202, 203, one on each end, over which is trained an endless link belt 201 of the same type as link belt 113, previously described. A guide track 204 is provided for the lower run 205 of the belt 201. This guide track when in normal position lies over the guide tracks 151 of castings 145 of the lower assemblies $F_1$ and $F_2$. Consequently, the upper runs of the lower gripper belts 113, 113a and the lower run 205 of the upper gripper belt 201 may be caused to grip traction rope H, as shown in Figs. 9, 11, this being the propelling or "cast on" position. The entire upper frame assembly is mounted on vertically disposed support members 207 which are pivotally mounted at their lower ends on the lower frame assemblies $F_1$, $F_2$ (see Fig. 11). When the tables 145 with their guide tracks 151 of assemblies $F_1$, $F_2$ are moved downwardly as hereinbefore described (see Fig. 13) the entire upper frame, including its sprockets, gripper belt and guide tracks may be swung on the pivots 208 to move the frame and upper belt 201 to one side of and away from traction rope H. Consequently, the gripper belts of the propelling mechanism E may be disengaged from or "cast off" from the traction rope. (See also Fig. 6, wherein the position of the upper gripper frame assembly in "cast off" position is indicated in phantom by dash lines.)

More particularly, the upper gripper frame comprises a horizontally disposed channel member 210 extending substantially the full length of the upper frame assembly G. Secured to the flanges at the forward end of this channel 210 are short sections 212, 213 of larger channel members mounting bearings 214, 215 in which is mounted for rotation the sprocket wheel shaft 211 to which is keyed sprocket wheel 202 (see Figs. 1, 2, 4, 5, 7). Secured to the flanges of channel 210 at its rearward end are similar short sections of larger channel members 216, 217 (see Figs. 2, 5) mounting bearings 218, 219 in which is mounted for rotation sprocket wheel shaft 220 to which is keyed sprocket wheel 203. The endless upper gripper link belt 201 is trained over the sprocket wheels 202, 203.

Secured to and depending from the long channel 210 are vertically disposed support members 222, 223, 224, 225. Referring more particularly to Fig. 11, which is a view on line 11—11 of Fig. 5, it will be seen that support member 223 provides a reinforced plate positioned crosswise of the length of the channel 210. Support member 222 is similar to 223 but oppositely disposed. Support members 222 and 223 are respectively similar to 224 and 225. The manner of connecting the vertical support members 207 to the reinforced supporting members 222, 223, 224, 225 is described later on.

Secured to the lower ends of the supporting members 222, 223, 224, 225 is a channel 226 extending substantially the full distance between the sprocket wheels 202, 203. Secured to its web and running the full length of channel 226 is a trackway and guide 204, for the lower run 205 of the upper link belt 201. It has parallel channel tracks 228, 229. The rollers 123 of the upper belt roll in these channel guides. Extending along the full length of channel 226 is a belt guide 230 removably secured to one flange of channel 226 and a similar guide 231 is removably secured to the other flange of channel 226. These guides prevent undue lateral or sidewise movement of the lower run 205 of the upper link belt and maintain it in proper alignment. Extending from support member 222 to support member 223 is a reinforcing structural member 232, T-shaped in cross-section and having its leg 233 upwardly disposed. This reinforcing T-shaped structural member 232 is secured to channel 226 and at one end to the supporting member 222 and at its other end to supporting member 223.

The construction of the rear end of the upper frame assembly 200 is the same as the construction of the forward end. That is, the parts and the construction between the vertical supports 224, 225 are the same as that between vertical supports 222, 223, described above. A belt guide track member 234 (see Figs. 5, 8) for the upper run of the upper belt 202 is supported on legs 235 secured to the channel 210. This prevents undue sag in the upper run of the upper gripper belt.

The manner of pivotally mounting the upper frame assembly G to the lower frame assemblies $F_1$, $F_2$ may be understood by particular reference to Figs. 4, 5, 11, 12, 13, 14. There are four vertically disposed tubular post members 207 which support the upper frame assembly G on the lower frame assemblies $F_1$, $F_2$. One pair is pivoted to the assembly $F_1$ and the other pair to assembly $F_2$; both pairs being mounted in the same way. Referring to Fig. 11, showing a view of a typical mounting, it will be seen that the tubular support post 207 has at its upper end an outwardly extending flat rigid cantilever arm 240, secured to the reinforced plate 223 by bolts 241 and at its lower end a flat rigid lever arm 242, extending outwardly in the same plane as arm 240. The arm 242 is further reinforced with a narrow plate 243. The lever arm 242 has a bore through which extends pivot pin 208 which is mounted in registering bores in upstanding side plates 244, 245 of a clevis mounting member 246. Flanges 248, 249 at the lower end of the clevis member 246 are secured to the webs of main frame channels 30, 31 (see Figs. 11, 12).

The outer end 250 of arm 242 extends beyond the plane of the web of main channel 30 and engages mechanism which is operative to maintain the outer end of arm 242 in down position and thereby maintain the upper frame assembly 200 in operative position (as shown in Fig. 11) or to raise the outer end of arm 242 to up position, thereby tilting the arm to rotate it about pivot 208 to swing the assembly away from the traction rope H to inoperative position (as shown in Fig. 13).

The arm tilting mechanism just mentioned comprises a crossarm member 251 positioned above and engaging the outer end portion 250 of arm 242 (see Figs. 5, 11). The crossarm is movable vertically within limits and is normally urged downwardly against lever arm 242 by compression springs 252, 253 mounted on telescoping sleeve spring retainers 254, 255 which are mounted on the long bolts 256, 257. These bolts, one at each side of arm 242, extend through bores in crossarm 251; through bores in a bracket plate 258; and then through bores in the flanges of two angles 259, 260 which are secured to the web of main channel 30. Bracket plate 258 rests on and is secured to the upper flange of channel 30. Bolts 256, 257 are maintained in place and prevented from vertical movement by nuts 261, above and below the angle iron flanges 259, 260. Nuts 262 at the upper ends of the bolts provide stops for restraining upward movement of spring retainers 254, 255.

A vertically disposed hydraulic cylinder 263, mounted between bolts 256, 257, rests upon the flanges of angles 259, 260 and extends through a cut out portion in bracket plate 258. The outer end of piston rod 264 of the hydraulic cylinder engages the underside of the outer end portion of arm 242. Normally the piston rod is in retracted position (as shown in Fig. 11) by reason of the force exerted downwardly on cross-arm 251 by compression springs 252, 253, which springs maintain upper frame assembly 200 in operative position when piston rod 264 is in retracted position. The hydraulic cylinder is operated in conventional fashion and serves as a jack to jack up the lever arm 242. That is, when hydraulic fluid under pressure is introduced into the cylinder, piston rod 264 is advanced and raises the outer end of arm 242 against the force of springs 252, 253 and rotates the arm about pivot 208, to swing the upper frame assembly 200 to the position shown in Fig. 13. When piston 264 is retracted, compression springs 252, 253 force crossarm 251 downwardly and this rotates the arm 242 and hence upper assembly 200 back to normal position, as shown in Fig. 11. Adjustable stops 265, 266 are provided to limit the rotational movement of arm 242 about its pivot 208.

There are four supporting posts 207 and each has an operating mechanism like the one just described; it being noted that there are a pair mounted on assembly $F_1$, one of the pair at its fore and the other at its aft end and a similar pair mounted on assembly $F_2$. All four hydraulic cylinders 263 operate in unison through the hydraulic system indicated conventionally by dash lines 144.

A traction rope guide sheave 270 at the fore end of the main frame C and a similar sheave 271 at the aft end of the main frame are mounted for free rotation on upstanding plates 272, one on each side of the sheave, and secured to the main frame. These guide sheaves have grooved peripheral flanges and serve to guide the stationary traction rope H as the car is propelled in either direction along the path of the rope.

The aerial tramway car described above may be operated as follows: Assume that the car is in operative position; that is, the trolleys A are suspended on the ropeway B and the propelling mechanism is in operative position, (viz: "cast on" to the traction rope). In this position the traction rope H is gripped by the gripper shoes 131 of the lower run 205 of the upper gripper belt 201 which is trained over sprocket wheels 202, 203 of the upper assembly G and by the gripper shoes 131 of the upper runs 146 of the lower gripper belts 113, 113a, which is trained over sprocket wheels 105, 111 and 105a, 111a of the lower gripper assemblies $F_1$, $F_2$. The motor 65 drives sprocket 68 through the driving connections 70 which are provided with transmission to drive sprocket 68 in either direction. Assuming sprocket 68 is rotated in clockwise direction, as viewed in Figs. 1, 2, drive chain 71 drives sprockets 112, 112a in the same direction, causing gripper belts 113, 113a to travel in a clockwise direction; that is, the upper runs 146, 146a of these belts travel from left to right relatively to main frame C, as viewed in Figs. 1, 2. Inasmuch as compression springs 158 urge casting 145 upwardly, the gripper links rolling on supporting trackway 151 are urged upwardly into engagement with stationary traction rope H since the guide trackway 204 of the upper assembly G is in fixed position relatively to the main frame and the rollers of the links of the lower run 205 of the upper gripper belt roll along trackway 204 and consequently the gripper shoes 113 of these links, in effect, exert a force in a downward direction opposite to the upwardly exerted force of the springs 158. Hence the traction rope is gripped between the lower run of the upper gripper belt and the upper runs of the lower gripper belts over a substantial distance around the rope and also along tractoin rope H. That is, there are a plurality of tread surfaces engaging the traction rope over a wide area both laterally and longitudinally of the rope. As the upper runs of the driven lower gripper belts move from left to right relatively to the main frame C and along the path of traction rope H (as viewed in Figs. 1, 2, 3), the lower run of the upper gripper belt moves along at the same speed because the upper belt is an idler belt since the sprockets 202, 203 are mounted for free rotation. Since the traction rope is stationary, that is, it does not move in a direction along the path of travel of the car, the car itself is propelled along the traction rope in a direction from right to left (as viewed in Figs. 1, 2, 3). The relation of various parts of the propelling mechanism when it is in operating position is illustrated in Figs. 9, 11, 12. Of course, the car may be driven in the opposite direction by reversing the direction of travel of the gripper belts.

Assume now that it is desired to disengage the gripper belts from the traction rope, that is, to move the propelling mechanism to inoperative position. The provision for disengaging the grippers from the traction rope in such manner that the car may be cast off from the traction rope is of important significance because it permits of readily and easily transferring the car from the tail end of a section of overhead ropeway to the head end of an adjoining section of overhead ropeway, for example, where said tail end and head end are secured to a high tower, as they must be in a long distance overhead tramway where many towers may be required. Of course, it will be manifest to those skilled in the art that this "cast off" feature has other advantages.

The relation of various parts of the propelling mechanism in inoperative or "cast off" position is illustrated in Figs. 13, 14. To bring the propelling mechanism to cast off position, the piston rods of hydraulic cylinders 172, 173 located beneath the castings 145 in both lower assemblies $F_1$, $F_2$ are caused to be advanced by introducing hydraulic fluid into the cylinders through lines 143 (see Figs. 1, 2). This forces the crossheads 157 downwardly and moves the castings 145 of assemblies $F_1$, $F_2$ downwardly against the upwardly exerted force of springs 158, to free traction rope H from the grip of the upper and lower gripper belts. After the castings 145 and their trackways 151 (of both assemblies $F_1$, $F_2$) are forced down by the hydraulic cylinders 172, 173, then hydraulic fluid under pressure is introduced simultaneously into the four hydraulic cylinders 263 to advance piston rods 264 of these cylinders. This raises the outer ends of the pivoted lever arms 242 against the forces of springs 252, 253 and rotates the four arms 242 about their pivots 208. This, in turn, swings the upper frame assembly including sprockets 202, 203, upper gripper belt 201, and its trackways and guides, in an arc away from traction rope H (as illustrated, for example, in phantom by dash lines 200 in Fig. 6), so that the propelling mechanism of the car itself is cast off free from the traction rope.

The manner of reengaging the propelling mechanism to the traction rope will be understood from the foregoing. Suffice it to say that the piston rods 264 of the four hydraulic cylinders 263 are retracted to permit springs 252, 253 to return the arms 242 to normal position, to swing the upper frame assembly 200 over the traction rope and the castings 145 of assemblies $F_1$, $F_2$ are raised by retracting the piston rods 176 and 177 of hydraulic cylinders 172, 173, and the springs 158 urge the castings upwardly so that the gripper belts grip the traction rope as illustrated in Figs. 9, 11.

It will be seen from the foregoing that the propelling mechanism provides an upper traveling endless gripper belt 201 which is complementary to the lower gripper belts 113, 113a and each of these belts carry traveling gripper links 118; the gripper links of the upper belt being complementary to the gripper links of the lower belts and each link of each oppositely disposed pair of links has a traction rope engaging surface, as shown, for example, in Fig. 9, and the traction rope is gripped between each complementary pair as they move along the path of the rope H. The springs 158 exert an upward force on castings 145 and hence on the gripper links, thus each complementary pair of links is urged toward each other to bring the rope engaging surfaces of the links into gripping engagement with the traction rope and the cylinders 176, 177 and 263 provide means operative to move the complementary gripper links away from each other to release them from gripping engagement with the rope to free it so that the car may be cast off or freed from the traction rope.

The terms and expressions which have been employed herein are used as terms of description and not of limitation, and there is not intention in the use of such terms and expressions of excluding any equivalent of the features shown and described or portions thereof, but it is recognized that various modifications are possible within the scope of invention claimed.

What is claimed is:

1. A power driven propelling device for hauling on a stationary traction rope comprising an upper and at least one lower frame, a lower endless travelling link belt mounted on sprockets on said lower frame, an upper endless travelling link belt mounted on sprockets on said upper frame, said sprockets normally lying in a single plane, said belts carrying traction rope grippers, the grippers of the lower run of said upper belt being complementary to and mating with the grippers of the upper run of said lower belt, said mating grippers being engageable with and disengageable from said traction rope, levers pivotally mounted on said lower frame, the pivotal axis of said levers lying in the plane of said sprockets and directly beneath and parallel with said rope when said rope is gripped between said mating grippers of the upper and lower runs of said belts and said levers mounting said upper frame for swinging movement about said pivotal axis, a power driven mechanism connected to drive at least one of said belts, an upper trackway guide above the lower run of said upper belt, a lower trackway guide below the upper run of said lower belt, yieldable means normally urging the grippers of the upper run of said lower belt and the lower run of said upper belt into gripping contact with said traction rope, said grippers driving said device along said traction rope when the mating grippers of said belts are in gripping contact with said traction rope and said belts are driven by said driving mechanism, jack means on said device connected to said lower trackway guide operative to overcome the force of said yieldable means which normally urge said mating grippers into gripping contact to disengage the mating grippers from gripping contact with said traction rope and to separate said mating grippers, and other mechanically operated means on said lower frame engaging said levers to rotate said levers about said pivotal axis to swing said upper frame to move the grippers of said upper belt free from said traction rope, when said mating grippers are in separated position.

2. A power driven propelling device for moving an aerial tramway car along a suspended overhead stationary traction rope comprising an upper and two lower frames, a lower endless travelling link belt mounted on sprockets on each of said lower frames, an upper endless travelling link belt mounted on sprockets on said upper frame, said sprockets normally lying in a single vertical plane, said belts carrying traction rope grippers, the grippers of the lower run of said upper belt being complementary to and mating with the grippers of the upper runs of said lower belts, said mating grippers being engageable with and disengageable from said traction rope, levers pivotally mounted on said lower frames, the pivotal axes of said levers lying beneath and parallel with said rope and in said vertical plane, said levers mounting said upper frame for swinging movement about the pivotal axis of said levers, a power driven mechanism connected to drive said belts, an upper trackway guide above the lower run of said upper belt, a lower trackway guide below each of the upper runs of said lower belts, compression springs on said lower frames normally urging said lower guides upwardly to force the grippers of the upper runs of said lower belts into gripping contact with said traction rope, said grippers driving said device along said traction rope when said belts are in gripping contact with said traction rope and driven by said driving mechanism, hydraulically operated jacks connected to said lower trackway guides to move said lower trackway guides downwardly against the force of said springs to disengage the grippers of said upper runs of said lower belts from said traction rope, and hydraulically operated jacks mounted on said lower frames and engaging said levers to rotate said levers about their pivots to swing said upper frame to swing the grippers of said upper belt free from said traction rope.

3. A power driven propelling device for hauling on a stationary traction rope comprising an upper and two lower frames, a lower endless travelling link belt mounted on sprockets on each of said lower frames, an upper endless travelling link belt mounted on sprockets on said upper frame, said sprockets normally lying in a single vertical plane, said belts carrying traction rope grippers, the grippers of the lower run of said upper belt being complementary to and mating with the grippers of the upper runs of said lower belts, said mating grippers of the upper and lower belts being engageable with and disengageable from said traction rope, levers pivotally mounted on said lower frame, the pivotal axis of said levers lying in said vertical plane and beneath and parallel with said rope when said rope is gripped between said mating grippers of the upper runs of said lower belts and lower run of said upper belt, said levers mounting said upper frame for swinging movement about said pivotal axis, a power driven mechanism connected to drive said lower belts, an upper trackway guide above the lower run of said upper belt, a lower trackway guide below the upper run of each of said lower belts, yieldable means on said lower frame normally urging the grippers of the upper runs of said lower belts upwardly toward the lower run of said upper belt to bring the grippers of the upper runs of said lower belts and the grippers of the lower run of said upper belt into gripping contact with said traction rope, said grippers driving said device along said traction rope when the mating grippers of said belts are in gripping contact with said traction rope and said lower belts are driven by said driving mechanism, jack means on said lower frame connected to said lower trackway guides to overcome the force of said yieldable means which normally urge said mating grippers into gripping contact to disengage the mating grippers from gripping contact with said traction rope and to separate said mating grippers, and other mechanically operated means on said lower frame engaging said levers to rotate said levers about said pivotal axis to swing said upper frame to move the grippers of said upper belt free from said traction rope, when said mating grippers are in separated postion.

4. A power driven propelling device constructed according to claim 1 in which said yieldable means normally urging said grippers of the upper run of the lower belt comprises an elongate member which is T-shaped in cross section and compression springs mounted on the lower frame assembly urging said T-shaped member upwardly against the upper run of said lower belt.

5. A power driven propelling device constructed according to claim 4 in which said jack means on said lower frame which are connected to said trackway guides to overcome the force of said compression springs comprise hydraulic jacks mounted on said lower frame adapted to be operated from a source of hydraulic power remote from said hydraulic jacks.

6. A power driven propelling device constructed according to claim 5 in which said mechanically operated means on said lower frame engaging said levers to rotate said levers about their pivotal axis comprises hydraulic jacks mounted on said lower frame having piston rods having a lifting action on said levers to swing said upper frame to cast-off position in which the upper belt is free from the traction rope.

7. A power driven propelling device constructed according to claim 2 in which said lower trackway guides are elongate members having a generally T-shaped cross section and said jacks which engage said levers have piston rods having, on their forward stroke, a lifting action on said levers to swing said upper frame to cast-off position in which said upper belt is free from said traction rope and said hydraulic jacks connected to said trackway guides may be operated from a place remote from said jacks.

8. A power driven propelling device constructed according to claim 7 which also includes a spring biased means on said lower frame engaging said levers urging said upper frame to cast-on position in which the grippers of the lower run of said upper belt are in contact with said traction rope when said piston rods are retracted.

9. A power driven propelling device constructed according to claim 3 in which said yieldable means normally urging the grippers of the upper runs of the lower belts upwardly comprises compression springs mounted on said lower frame urging said lower trackway guides upwardly against the upper runs of said lower belts and said jack means for overcoming the force of said compression springs are hydraulic jacks operable from a place remote from said jacks and said other mechanically operated means engaging said levers to rotate said levers comprises hydraulic jacks having piston rods to exert a lifting action on said levers on their forward stroke and controlled from a place remote from said last mentioned jacks.

10. A propelling device constructed according to claim 9 in which the means for swinging said levers about their pivots include spring biased means urging said levers to move said upper frame to cast-on position in which the grippers of the lower run of said upper belt engages said traction rope, when said piston rods are in retracted position.

References Cited in the file of this patent

UNITED STATES PATENTS

| | | |
|---|---|---|
| 1,313,358 | Watkins | Aug. 19, 1919 |
| 1,321,463 | Lloyd | Nov. 11, 1919 |
| 1,527,489 | Pendleton | Feb. 24, 1925 |
| 2,018,087 | Plass | Oct. 22, 1935 |
| 2,038,732 | Guthrie | Apr. 28, 1936 |
| 2,349,263 | Grabinski | May 23, 1944 |
| 2,547,935 | Grabinski | Apr. 10, 1951 |

FOREIGN PATENTS

| | | |
|---|---|---|
| 117,541 | Austria | Apr. 25, 1930 |
| 117,559 | Austria | Apr. 25, 1930 |
| 11,063 | Great Britain of 1885 | June 17, 1886 |